(No Model.)
A. SPRAGUE.
ELECTRIC RAILWAY.
No. 573,169. Patented Dec. 15, 1896.
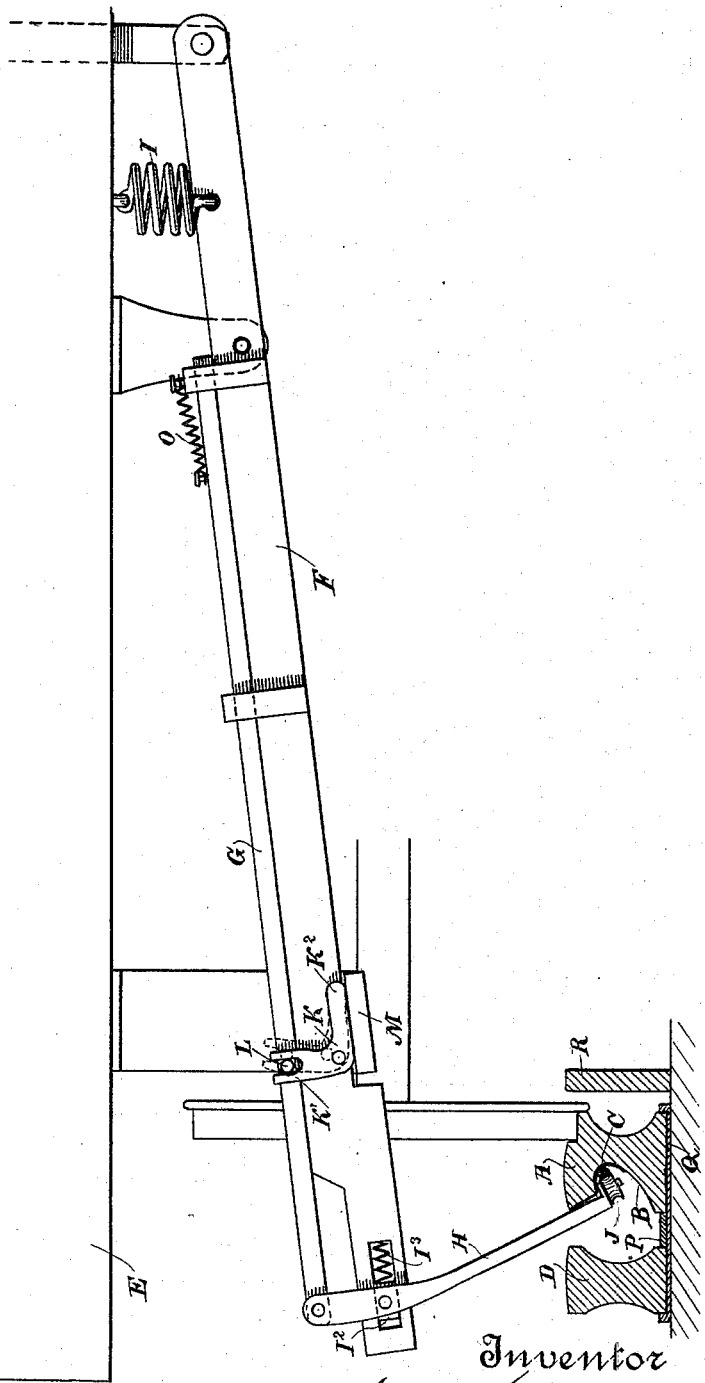
Witnesses,
Inventor
Anson Sprague
By Dewey & Co.

UNITED STATES PATENT OFFICE.

ANSON SPRAGUE, OF SAN LEANDRO, CALIFORNIA.

ELECTRIC RAILWAY.

SPECIFICATION forming part of Letters Patent No. 573,169, dated December 15, 1896.

Application filed March 30, 1896. Serial No. 585,394. (No model.)

*To all whom it may concern:*

Be it known that I, ANSON SPRAGUE, a citizen of the United States, residing at San Leandro, county of Alameda, State of California, have invented an Improvement in Electric-Railway Construction; and I hereby declare the following to be a full, clear, and exact description of the same.

My invention relates to improvements in electric railways; and it consists in the parts and the construction and combinations of parts hereinafter described and claimed.

The figure is a transverse sectional view of the rails and car, showing the arrangement of the mechanism.

A represents a rail of any suitable construction for the car-wheels to travel on. Upon one side this rail has a channel B formed in it when the rail is rolled, these channels being such that they form a continuous passage or groove upon the side and beneath the overhang of the upper part of the rail. This groove or passage is preferably lined with any suitable non-conducting material, and the electric-conducting wire C is supported in this groove or channel by suitable carriers, so that while forming a continuous conductor for the electric current it is not in contact with the rail or with any part through which the current may escape.

D is a second rail which is extended along parallel with the rail A and at such a distance therefrom that a channel is left between the two. Through this channel a connecting device between the electric conductor C and the mechanism and motor upon the car is made as follows: Upon the car E is mounted a horizontally-disposed lever F, so fulcrumed that it may turn about its fulcrum-point by any suitable actuating mechanism and the outer end be raised or depressed. In the present case I have shown the lever F standing transversely and having slidably mounted upon it an arm G. To the lever F is fulcrumed a vertical lever-arm H, the upper end of which is connected with the sliding arm G. This lever-arm H is in such a position that when the lever F is turned about its fulcrum-point the lower end of the arm H may be caused to descend into the slot between the rails A and D or be raised out of the slot. The movement of the lever-arm F is here shown as effected in one direction to depress it by a spring I suitably connected with the lever and with some fixed point upon the car, but, if preferred, it may be actuated by direct pressure or by gravitation. The tendency of this spring, as I have here shown it, is to normally press the lever F down and to consequently move the lower end of the lever H into the channel between the rails A and D.

Upon the lower end of the lever H is journaled a trolley-wheel J, which is adapted to be brought into contact with the wire C, as follows: The upper end of the lever H, as before described, is connected with the sliding arm G, which retains the lever H in position to enter the channel between the rails or to be moved out therefrom when the lever F is depressed or raised. When the lever F is raised by pressing upon it with the foot or by other means, the lever-arm H will be raised entirely clear of the rails and to such a height as to allow the car to cross any other track which may pass transversely to it. As soon as the lever F is released the spring I, before described, acts to draw it down and move the lower end of the lever-arm H and the trolley-wheel J into the channel between the rails A and D.

Upon the lever-arm F is fulcrumed a bell-crank lever or arm K, one end of which is pivotally connected with the sliding bar G, as shown at L, and the position of this bell-crank lever is such that the lower arm $K^2$ will form contact with a projection or stop M after the trolley J has entered the channel between the rails A and D. The further action of the spring still forcing the lever-arm F down causes the bell-crank lever K $K^2$ to form contact with the stop M, and this turns the lever about its fulcrum-point, so that the upper arm K' acts upon the pin at L and moves the sliding bar G along upon the lever F. This movement acts upon the lever H, which is pivoted to F and connected with G, and thus swings the lower end of the lever H, so that the trolley J is brought into contact with the conductor C and is so retained as long as the lever F remains pressed down.

Whenever the lever F is raised by pressure of the foot upon the opposite end or by other means, the first result is to raise the bell-crank lever K from its contact with the projection or stop M. This allows a spring O to act upon the sliding bar G, and thus move it upon the top of the lever F. This backward movement of the sliding bar, acting through its connection with the lever H, swings the latter upon its fulcrum-pin on the lever F, and thus breaks contact between the trolley J and the conductor C. It also brings the trolley in such position that the continued upward movement of the lever F will raise it out of the channel between the rails, thus entirely disengaging the apparatus from the conductor and raising it so that it will clear any transverse obstruction, such as another line of car-tracks.

Modifications of this construction may be easily made without materially altering the operation of the device which is essentially illustrated herein.

The rails A and D are suitably retained with relation to each other by means of interposed metallic plates or bars P, and the rails are prevented from spreading by transverse bars Q, having upturned ends to engage the outer flanges for this purpose.

The channel formed between the rails can be drained and kept clear of water or dust by means of suitable passages and discharge pipes or channels beneath.

At points where interruptions take place, such as the crossing of another track, the trolley may be raised from the channel and the conducting-wire may be temporarily carried beneath the surface of the ground and beneath the transverse line of track, that portion of the wire being properly protected by a non-conductor covering.

As there is often a considerable side movement of the car at high speed, this may be controlled by a guard-rail R, which limits it. In order to still further insure that the arm H and trolley J will enter and leave the channels between the rails A and D and to compensate for irregular side motion of the car, I have shown the fulcrum of the arm H upon the lever F upon a block $I^2$, slidable in longitudinal guides on the lever. A spring $I^3$ presses against this block and holds it normally in place, but this spring yields if the side motion of the car should cause the trolley to strike the sides of the channel, and will thus allow the trolley to enter or leave the channel.

Having thus described my invention, what I claim as new, and desire to secure by Letters Patent, is—

1. In an electric railway, a channeled insulated surface-rail having a conductor fixed to it, a pivotally-secured lever having a trolley to engage the conductor, a lever by which the trolley-lever is carried and a slide connected with the latter lever and adapted to move the trolley into and out of contact with the conductor.

2. In an electric railway, the main rail having a groove or channel formed beneath the overhanging top of the rail, said groove or channel being insulated, a continuous conducting-wire fixed within the insulated groove or channel, a guard-rail extending parallel with the main rail and forming a continuous channel between the two, lever-arms provided with trolley-wheels to enter said channel and engage the conductor, a lever-arm fulcrumed on the car and having the trolley-lever fulcrumed in its outer end, and a slide connecting with the trolley-lever above its fulcrum and adapted to move the trolley-wheel into and out of contact with the conductor.

3. In an electric railway, the combination, of the main rail having a conducting-wire fixed to it, a lever fulcrumed on the car, a trolley pivotally suspended from the lever and a slidable bar for rocking the trolley about its point of suspension to move it into and out of contact with the conductor.

4. In an electric railway and car, a continuous channeled rail, a conducting-wire protected and insulated within the groove or channel of the rail, a lever-arm fulcrumed upon the car and means whereby said arm is moved about its fulcrum to depress the outer end, a second lever-arm fulcrumed upon the first one extending downward having a trolley-wheel journaled upon its lower end, a bar slidable upon the top of the first-named lever-arm and connected with the trolley-lever so as to turn the latter about its fulcrum, and a mechanism for sliding said bar when the lever is depressed so that the trolley-wheel is thrown into contact with the conducting-wire and is removed therefrom when the lever commences to rise.

5. In an electric railway, a grooved insulated rail, a conducting-wire secured along within the groove beneath the head of the rail, a supplemental guard-rail parallel thereto forming a continuous channel between the two, an arm carrying a trolley-wheel at its lower end having the upper end fulcrumed upon a lever which is vertically movable upon the car, a bar slidable upon the top of said lever to which the upper end of the trolley-arm is connected and a contact bell-crank lever fulcrumed upon the car-lever and connected with the slidable bar so that when the latter is depressed, the slidable bar is moved to throw the trolley into contact with its conducting-wire and when the lever is raised the slidable bar first moves the trolley out of contact with the wire and into line with the channel between the rails so that it can be lifted clear therefrom.

In witness whereof I have hereunto set my hand.

ANSON SPRAGUE.

Witnesses:
S. H. NOURSE,
JESSIE C. BRODIE.